US005535844A

United States Patent [19]
Samford

[11] Patent Number: 5,535,844
[45] Date of Patent: Jul. 16, 1996

[54] VEHICLE ANTI-THEFT DEVICE

[76] Inventor: Ricky L. Samford, Rte. #1 Box 58, Edgewood, Tex. 75117

[21] Appl. No.: 395,797

[22] Filed: Feb. 28, 1995

[51] Int. Cl.⁶ .................................................. B60R 25/00
[52] U.S. Cl. ........................ 180/287; 307/10.2; 340/426
[58] Field of Search .......................... 180/287; 307/10.4, 307/10.5, 10.2; 340/425.5, 426

[56] References Cited

U.S. PATENT DOCUMENTS

| | | | |
|---|---|---|---|
| 4,682,062 | 7/1987 | Weinberger | 180/287 |
| 4,690,240 | 9/1987 | Russo | 180/287 |
| 4,805,722 | 2/1989 | Keating et al. | 180/287 |
| 4,910,493 | 3/1990 | Chambers et al. | 180/287 |
| 5,045,837 | 9/1991 | Gosker | 180/287 |
| 5,370,201 | 12/1994 | Inubushi | 180/287 |

*Primary Examiner*—Paul N. Dickson

[57] ABSTRACT

A vehicle anti-theft device including a portable transmitter for emitting control signals; a tuned receiver mechanism coupleable to a vehicle for receiving the control signals; a first switch having an engaged orientation for preventing a hood of a vehicle from being opened; a second switch having an engaged orientation for preventing flow of fuel from a gas tank to an engine of a vehicle; and a console mechanism coupled to the receiver mechanism and responsive to the received control signals for placing the first and second switches in their engaged orientations upon receipt of control signals.

7 Claims, 6 Drawing Sheets

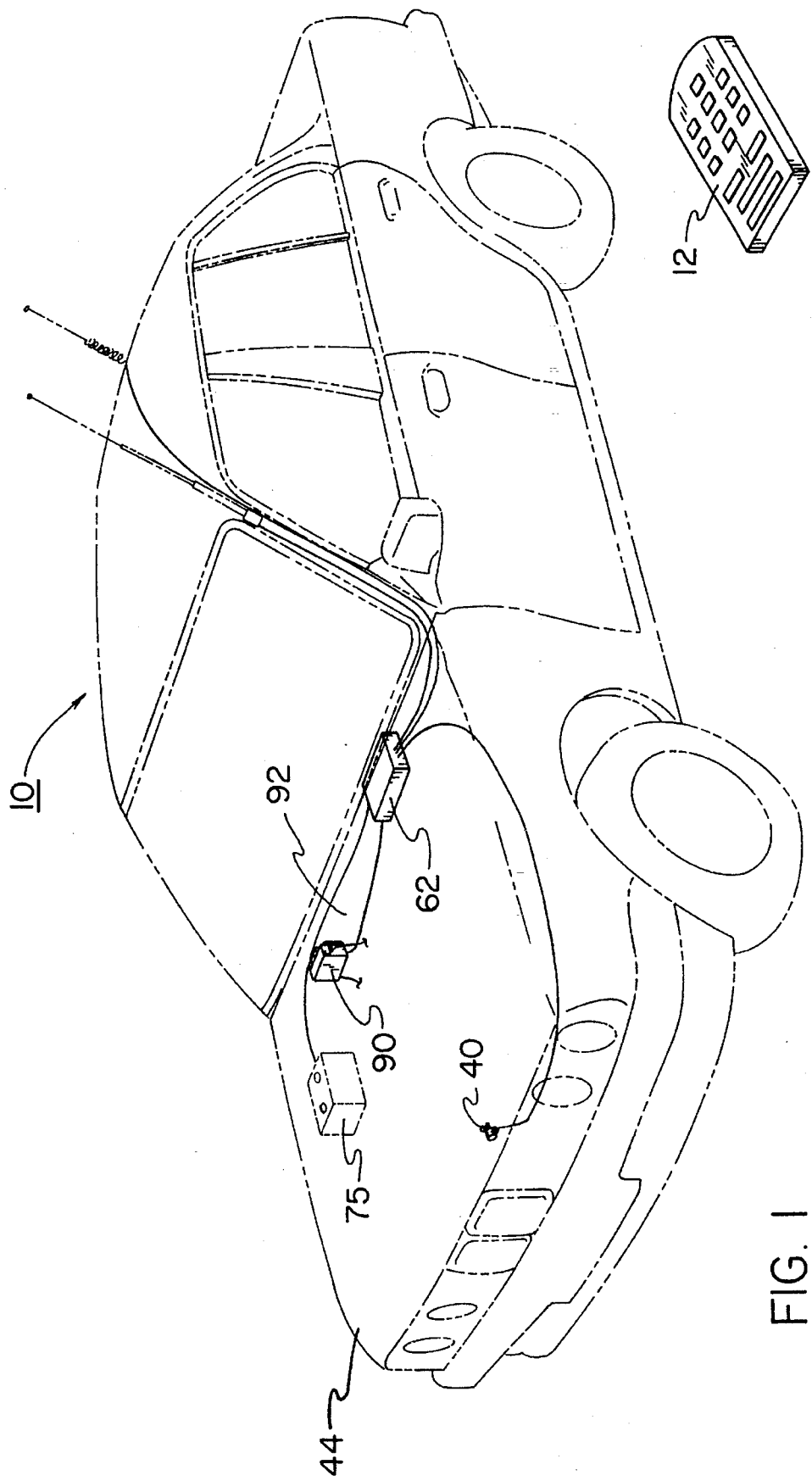

VEHICLE ANTI-THEFT DEVICE

BACKGROUND OF THE INVENTION

1. Field of the Invention

The present invention relates to a vehicle anti-theft device and more particularly pertains to preventing unauthorized operation of a vehicle with a vehicle anti-theft device.

2. Description of the Prior Art

The use of vehicle anti-theft systems and components is known in the prior art. More specifically, vehicle anti-theft systems and components heretofore devised and utilized for the purpose of preventing access to and operation of a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,275,753 to Williams discloses a fuel line cut-off switch. U.S. Pat. No. 4,430,980 to Pigeon discloses a fuel pump cut-off circuit. U.S. Pat. No. 4,790,275 to Iida discloses a fuel supply cut-off control system for the engine of an automobile vehicle. U.S. Pat. No. 5,045,837 to Gosker discloses a fuel cut-off anti-theft device. U.S. Pat. No. 5,193,641 to Durrell discloses an anti-theft vehicle system and method.

While these devices fulfill their respective, particular objective and requirements, the aforementioned patents do not describe a vehicle anti-theft device that, when activated, prevents fuel from being delivered to an engine of a vehicle, prevents access thereto by simultaneously locking the hood of a vehicle, and transmits an emergency signal to a remote location.

In this respect, the vehicle anti-theft device according to the present invention substantially departs from the conventional concepts and designs of the prior art, and in doing so provides an apparatus primarily developed for the purpose of preventing unauthorized operation of a vehicle.

Therefore, it can be appreciated that there exists a continuing need for a new and improved vehicle anti-theft device which can be used for preventing unauthorized operation of a vehicle. In this regard, the present invention substantially fulfills this need.

SUMMARY OF THE INVENTION

In the view of the foregoing disadvantages inherent in the known types of vehicle anti-theft systems and components now present in the prior art, the present invention provides an improved vehicle anti-theft device. As such, the general purpose of the present invention, which will be described subsequently in greater detail, is to provide a new and improved vehicle anti-theft device and method which has all the advantages of the prior art and none of the disadvantages.

To attain this, the present invention essentially comprises, in combination, a hand-held portable remote control unit including a rigid hollow plastic container, a transmitter disposed within the container and operatively extended therefrom, a battery operatively coupled to the transmitter for supply electrical energy, and control circuitry coupled to the transmitter for controlling its operation. The control circuitry includes a plurality of numeric keys extended through the housing with the keys bearing integers from 0 to 9, respectively. The numeric keys are depressible in a predetermined sequence for causing the transmitter to emit a valid code control signal. The control circuitry further includes a first control key, a second control key, a third control key, and a fourth control key. The first control key is depressible for causing the transmitter to emit a program code control signal. The second control key is depressible for causing the transmitter emit an anti-theft activation control signal. The third control key is depressible for causing the transmitter to emit an anti-theft deactivation control signal. The fourth control key is depressible for causing the transmitter to emit a panic cellular phone call activation control signal.

A first antenna is included and coupleable to a vehicle. The antenna is tuned for receiving the control signals from the remote control unit. A plunger-type first solenoid is provided and coupleable to a hood latch of a hood on a vehicle. The first solenoid has an engaged orientation for preventing the latch from being opened, thereby preventing access within an engine compartment of a vehicle. The first solenoid has a disengaged orientation for allowing the latch to be opened, thereby allowing access within an engine compartment of a vehicle. A valve-type second solenoid is also provided. The second solenoid has an inlet coupleable to a fuel supply line from a gas tank of a vehicle and an outlet coupleable to a fuel delivery line of an engine of a vehicle. The second solenoid has an engaged orientation for preventing flow of fuel from a gas tank to an engine of a vehicle and a disengaged orientation for allowing such flow.

A computerized control console encased in a rigid container is included. The control console is positionable within and coupleable to an engine compartment of a vehicle. The control console includes an amplifier mechanism coupled to the first antenna for receiving the control signals therefrom and transmitting amplified control signals. The control console includes a solenoid control mechanism for placing the first and second solenoids in the engaged orientation upon receiving the anti-theft activation control signal from the amplifier mechanism. The control console includes an anti-theft shut down mechanism for placing the first and second solenoids in the disengaged orientation upon receiving the anti-theft deactivation control signal from the amplifier mechanism. The control console includes a cellular phone activation mechanism for dialing a designated telephone number and transmitting an emergency signal upon receiving a panic cellular phone call activation control signal from the amplifier mechanism. The control console includes a power control mechanism coupleable to a battery of a vehicle for receiving electrical energy therefrom. The power control mechanism is coupled to the amplifier mechanism, the solenoid control mechanism, the anti-theft shut down mechanism, and the cellular phone activation mechanism. The power control mechanism has an enabled mode for allowing electrical energy to be delivered to the amplifier mechanism, the solenoid control mechanism, the anti-theft shut down mechanism, and the cellular phone activation mechanism. The cellular phone activation mechanism also has a disabled mode for preventing such delivery. Lastly, the control console includes a reset and program mechanism for selectively placing the power control mechanism in an enabled mode of operation upon receiving the valid code control signal and the anti-theft activation control signal from the amplifier mechanism and for placing the power control mechanism in a disabled mode of operation upon receiving the valid code control signal and the anti-theft deactivation control signal. The reset and program mechanism is further used for allowing the valid code control signal to be changed upon receipt of the valid code control signal, the program code control signal, and another valid code control signal, respectively, and with this latter valid code control signal being designated as the current valid code control signal.

A second antenna is included coupled to the cellular phone activation means of the control console for receiving and transmitting the emergency signal for subsequent receipt by an external remote monitoring source. A rigid cover is included and disposed over the second solenoid and securable to a firewall within an engine compartment of a vehicle to prevent unauthorized access thereto. The cover has a hollow box-shaped central portion with a top wall, a periphery extended downwards from the top wall formed of an upper horizontal side wall, a lower horizontal side wall, and two vertical side walls therebetween. Each side wall has a lip projected outwards therefrom. Each lip has a plurality of holes disposed thereon.

Two pairs of elongated rigid clamps are included. Each clamp has a first flat end with a hole disposed thereon, a second flat end with a hole disposed thereon, and a U-shaped portion therebetween. A plurality of screws are included and extended through the holes on the lips of the cover for coupling the cover to a firewall within an engine compartment of a vehicle. One pair of clamps is secured to a firewall within an engine compartment of a vehicle and secures a fuel supply line from a gas tank of a vehicle therebetween. The other pair of clamps is secured to a firewall within an engine compartment of a vehicle and secures a fuel delivery line to an engine of a vehicle therebetween. Each screw has a screw head with a generally octagonal recess formed thereon to define a bottom surface with eight upstanding side edges extended therearound and with one of the side edges further projected inwardly toward the center of the recess to create a triangular protrusion. Lastly, a screwdriver is included and has a rigid shaft with a base end and a tip end. The tip end has a shape conforming to the screw head for removable thereto for tightening and loosening a screw.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle anti-theft device which has all the advantages of the prior art vehicle anti-theft systems and components and none of the disadvantages.

It is another object of the present invention to provide a new and improved vehicle anti-theft device which may be easily and efficiently manufactured and marketed.

It is a further object of the present invention to provide a new and improved vehicle anti-theft device which is of durable and reliable construction.

An even further object of the present invention is to provide a new and improved vehicle anti-theft device which is susceptible of a low cost of manufacture with regard to both materials and labor, and which accordingly is then susceptible of low prices of sale to the consuming public, thereby making such a vehicle anti-theft device economically available to the buying public.

Still yet another object of the present invention is to provide a new and improved vehicle anti-theft device which provides in the apparatuses and methods of the prior art some of the advantages thereof, while simultaneously overcoming some of the disadvantages normally associated therewith.

Even still another object of the present invention is to provide a new and improved vehicle anti-theft device comprising hand-held portable remote control transmitter means for selectively emitting a valid code control signal, a program code control signal, an anti-theft activation control signal, and an anti-theft deactivation control signal; receiver means coupleable to a vehicle and tuned for receiving the control signals; first switch means having an engaged orientation for preventing a hood of a vehicle from being opened and a disengaged orientation for allowing the hood to be opened; second switch means having an engaged orientation for preventing flow of fuel from a gas tank to an engine of a vehicle and a disengaged orientation for allowing such flow; switch control means coupled to the receiver means for placing the first and second switch means in the engaged orientation upon receiving the anti-theft activation control signal; anti-theft shut down means coupled to the receiver means for placing the first and second switch means in the disengaged orientation upon receiving the anti-theft deactivation control signal; power control means coupleable to a battery of a vehicle for receiving electrical energy therefrom and coupled to the switch control means and anti-theft shut down means for supplying electrical energy for operation, the power control means having an enabled mode for allowing electrical energy to be supplied to the switch control means and anti-theft shut down means and a disabled mode for preventing such supply; and reset and program means coupled to the receiver means for selectively placing the power control means in an enabled mode of operation upon receiving the valid code control signal and the anti-theft activation control signal and for placing the power control means in a disabled mode of operation upon receiving the valid code control signal and the anti-theft deactivation control signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a portion of alarm circuitry of the present invention secured within an engine compartment of a vehicle.

FIG. 2 is a perspective view of the portable remote control unit of the present invention.

The same reference numerals refer to the same parts through the various Figures.

DESCRIPTION OF THE PREFERRED EMBODIMENT

Figure 5:
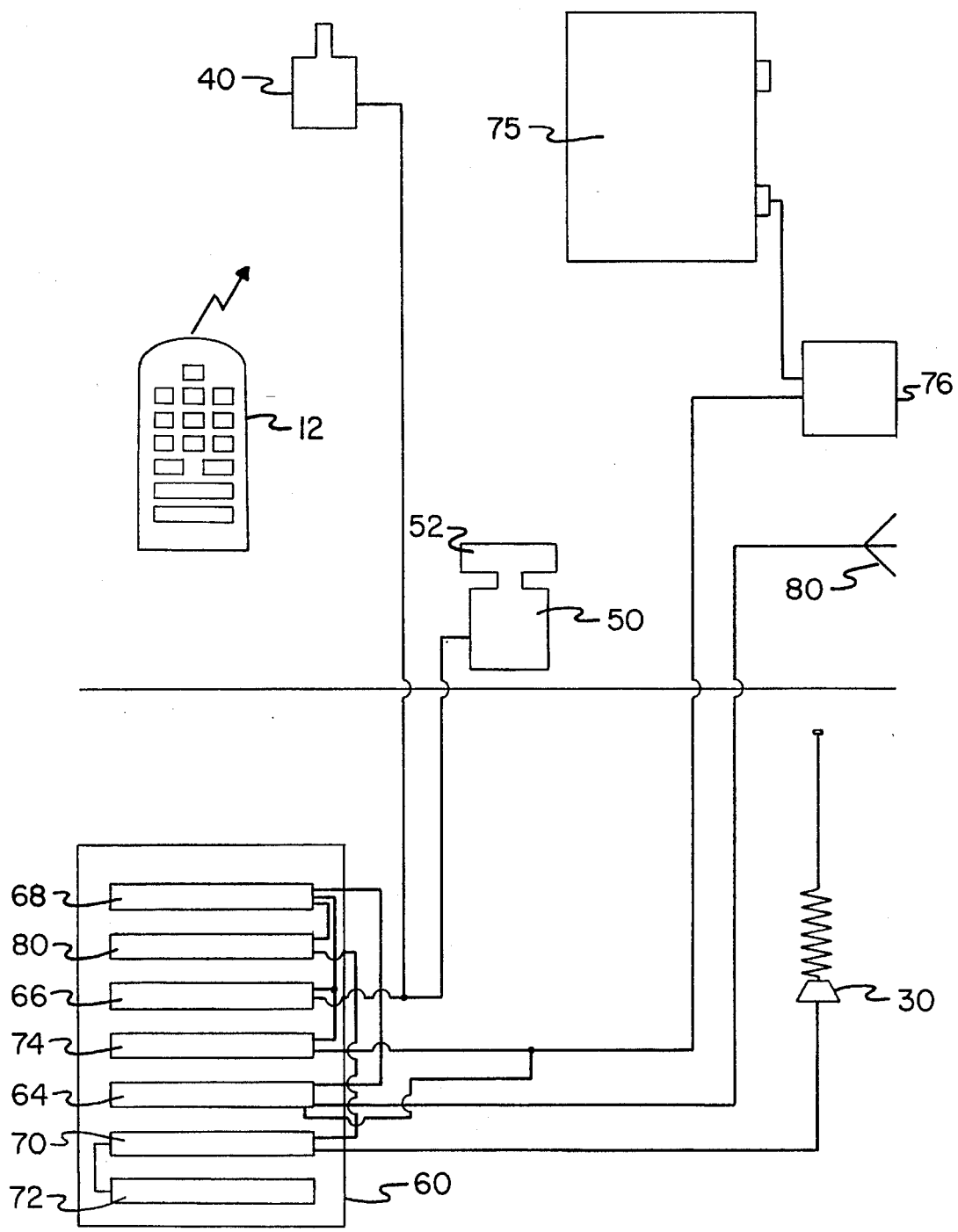
FIG. 5 is a schematic diagram depicting the electrical interconnection of components of the present invention and their relation with the electrical system of a vehicle.
Figure 6:
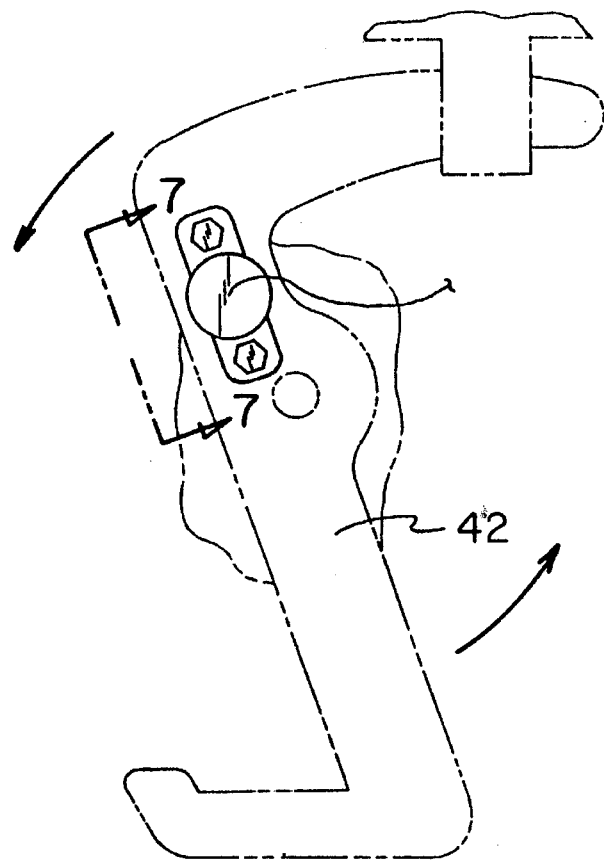
FIG. 6 is a side elevational view of the plunger-type solenoid of the present invention operatively secured to a hood lock of a vehicle.
Figure 12:
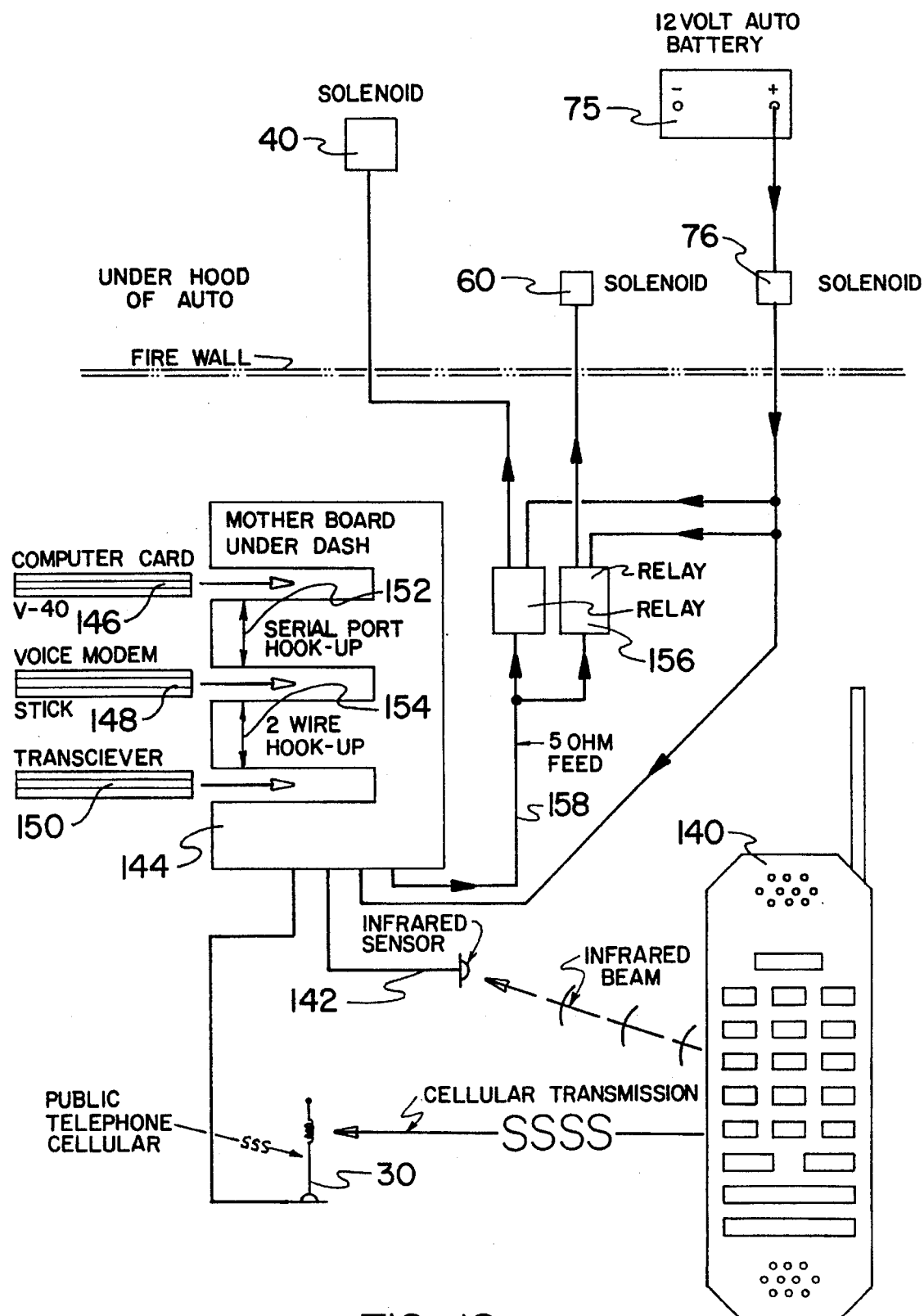
FIG. 12 is a schematic diagram depicting the electrical interconnection of components of a second embodiment of the present invention and their relation with the electrical system of a vehicle.

With reference now to the drawings, and in particular, to FIGS. 5 and 12 thereof, the preferred embodiment of the new and improved vehicle anti-theft device embodying the principles and concepts of the present invention and generally designated by the reference number 10 will be described.

The present invention is comprised of a plurality of components. In their broadest context, such components include a remote control unit, antennas, solenoids, and control console. Such components are individually configured and correlated with respect to each other to provide the intended function of preventing unauthorized operation of a vehicle.

Specifically, the present invention includes a handle-held portable remote control unit 12. The remote control unit includes a rigid hollow plastic container 14. An electrically energizeable transmitter 16 is disposed within the container and operatively extended therefrom for transmission purposes. A removable battery is operatively coupled to the transmitter for supplying electrical energy thereto. The battery is conventional in design and commercially available. The battery is accessible through a removable door on the container.

Figure 8:
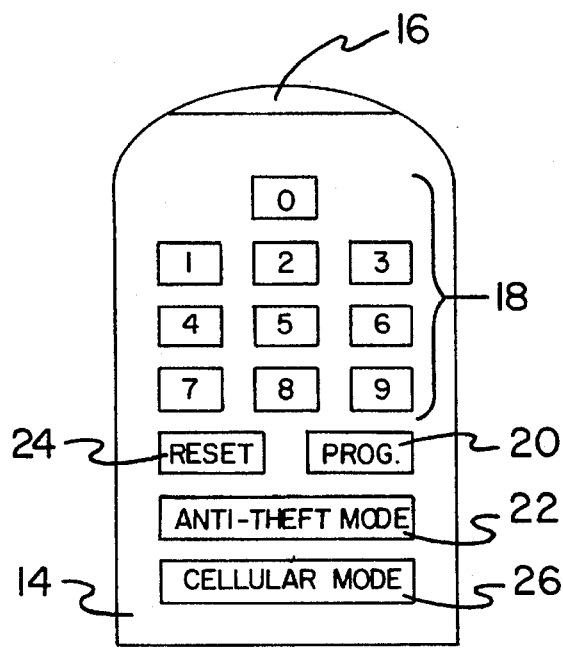
FIG. 8 is a plan view of the remote control unit of the present invention.
Figure 9:
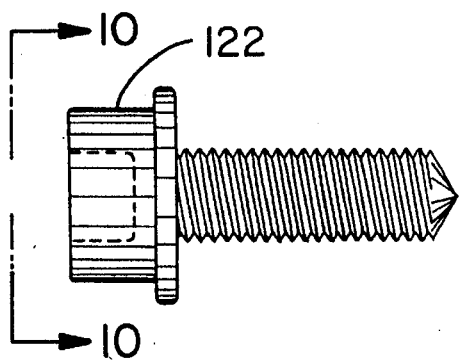
FIG. 9 is a view of one of the screws of the present invention.
Figure 10:
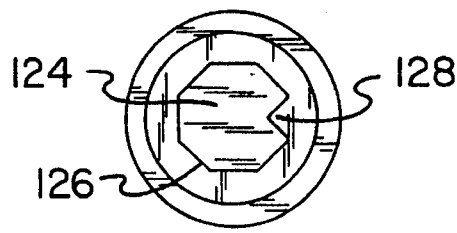
FIG. 10 is a view of one of the screws of the present invention taken along the line 10—10 of FIG. 9.
Figure 11:
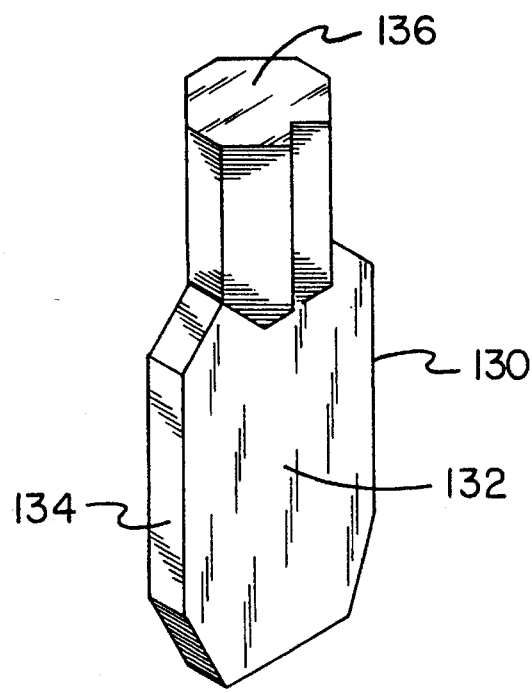
FIG. 11 is a view of the screwdriver used to tighten or loosen the screws of the present invention.

Control circuitry is also included in the remote control unit. The control circuitry is coupled to the transmitter and is used for controlling its operation. The control circuitry includes a plurality of numeric keys 18 extended through the top portion of the container. The keys bear integers from 0 to 9, respectively. The numeric keys are depressible in a predetermined sequence for generating a code. When the code entered by a user is determined to be valid, the control circuitry causes the transmitter to emit a valid code control signal into free space. The valid code control signal is used for placing the remaining portion of the present invention as shown in FIG. 1 into operation. The control circuitry also includes a first control key 20, a second control key 22, a third control key 24, and a fourth control key 26 as shown in FIG. 8. The first control key is labeled "Program" and is depressible for causing the transmitter to emit a program code control signal. The second control key is labeled "Anti-Theft Mode" and is depressible for causing the transmitter to emit an anti-theft activation control signal. The third control key labeled "Reset" and is depressible for causing the transmitter to emit an anti-theft deactivation signal. Lastly, the fourth control key is labeled "Cellular Mode" and is depressible for causing the transmitter to emit a panic cellular phone call activation control signal.

Also provided is a first antenna 30. The first antenna is coupleable to a vehicle. The first antenna is tuned for receiving the aforementioned control signals from the remote control unit 12.

Figure 7:
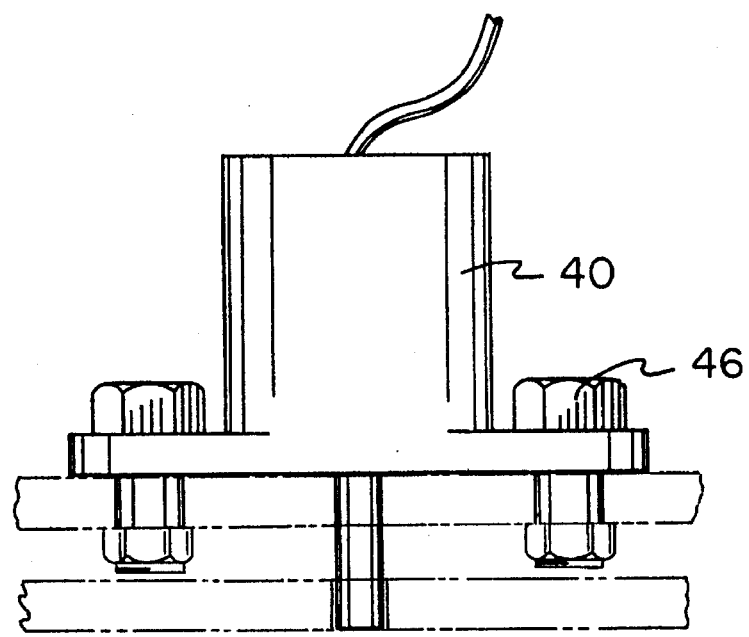
FIG. 7 is a view of the first solenoid and its association with a hood lock of a vehicle taken along the line 7—7 of FIG. 6.

Included is a plunger-type first solenoid 40 as shown in FIG. 7. The first solenoid is coupleable to a hood latch 42 of a hood 44 on a vehicle. The first solenoid has an engaged orientation for preventing the hood latch from being opened. Thus, it prevents access within an engine compartment of a vehicle. The first solenoid also has a disengaged orientation for allowing the latch to be opened. In the disengaged orientation, access to the engine compartment to the vehicle is allowed. The solenoid has a body section with ¼ inch diameter tubular plunger extended therefrom. Bolts 46 with complementary nuts are used for securing the first solenoid to a latch of a vehicle. The first solenoid is operable when energized with 12 volt power.

Figure 3:
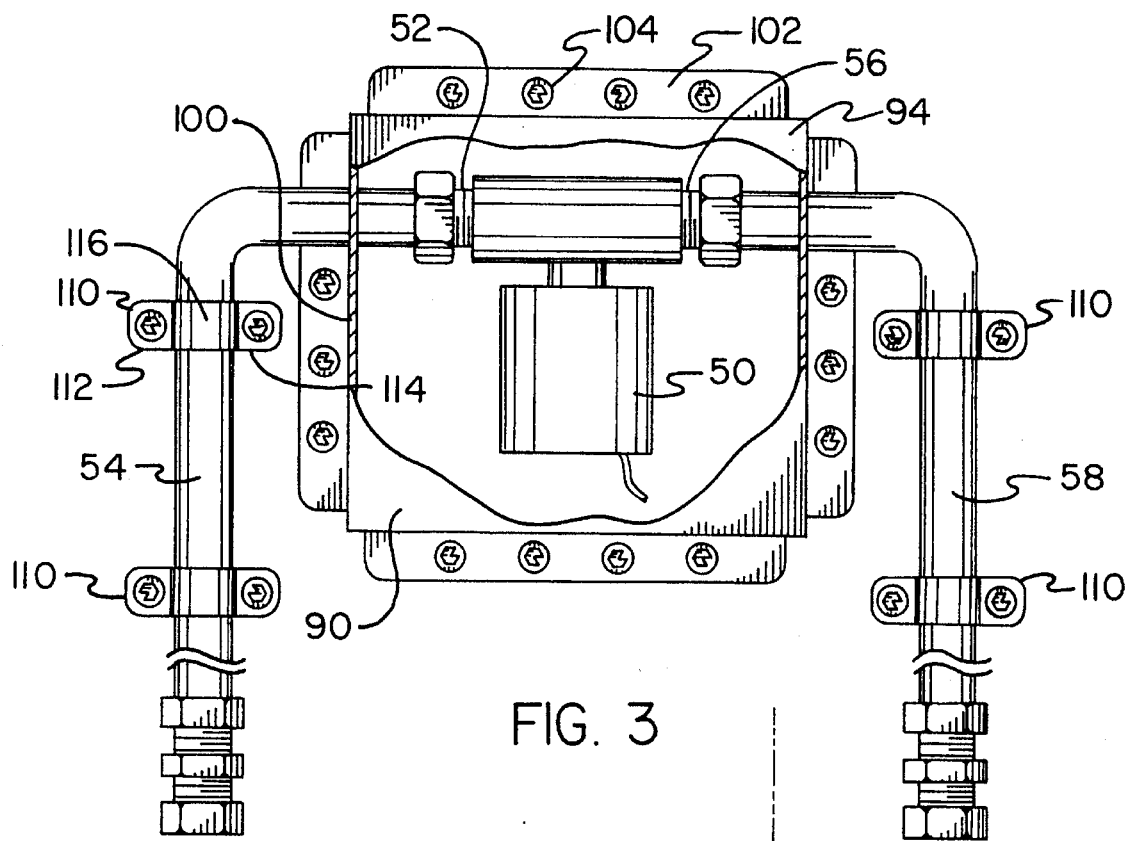
FIG. 3 is a side elevational view of the tamper resistant cover with a portion thereof removed for allowing the valve-type solenoid to be viewed.
Figure 4:
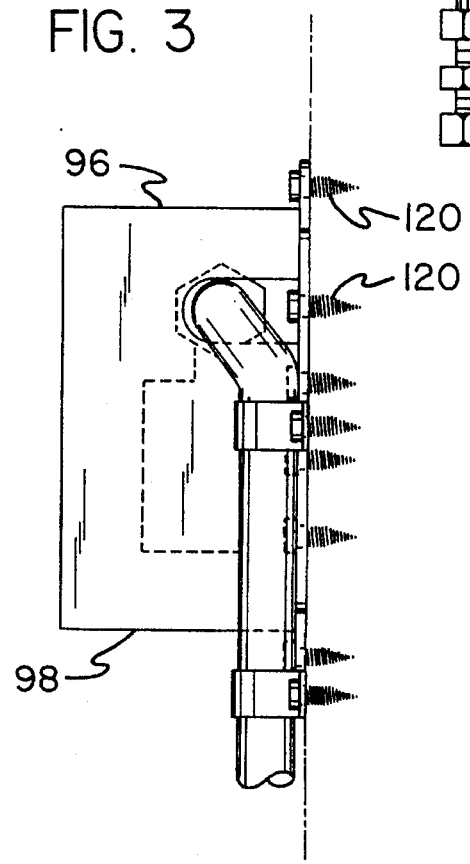
FIG. 4 is a side elevational view of the tamper-resistant housing secured to a fire wall within the engine compartment of the vehicle. A plurality of bolts with tamper-resistant screw heads are used to perform the securement.

Also included is a valve-type second solenoid 50 as shown in FIG. 3. The second solenoid has an inlet 52 coupleable to a fuel supply line 54 from a gas tank of a vehicle. The second solenoid also has an outlet 56 coupled to a fuel delivery line 58 extending to an engine of a vehicle. The second solenoid has an engaged orientation for preventing flow of fuel to a gas tank to an engine of a vehicle. The second solenoid also has a disengaged orientation for allowing such flow. The second solenoid has a body with a gate valve type stop for opening and closing the lines. The second solenoid is operable with 12 volt electrical power.

Also included is a computerized control console 60. The control console is encased in a rigid container 62. Then container 62 is positionable within and coupleable to a fire wall of an engine compartment of a vehicle. The control console includes an electrically energizeable amplifier mechanism 64. The amplifier mechanism is connected to the first antenna 30. The amplifier mechanism is used for receiving the control signals from the antenna and transmitting amplified control signals therefrom.

The control console also includes a solenoid control mechanism 66. The solenoid control mechanism is used for placing the first solenoid 40 and second solenoid 50 in the engaged orientation. It places the solenoids in the engaged orientation upon receiving the anti-theft activation control signal from the amplifier mechanism. Also included is an anti-theft shut down mechanism. The anti-theft shut down mechanism is used for placing the first solenoid and the second solenoid in the disengaged orientation. The solenoids are placed in the disengaged orientation when the anti-theft mechanism receives the anti-theft deactivation control signal from the amplifier mechanism.

As an added feature, a cellular phone activation mechanism 70 is included. The cellular phone activation mechanism is used for dialing a designated telephone number and transmitting an emergency signal upon receiving a panic cellular phone call activation signal from the amplifier mechanism 72. The telephone number dialed can be a conventional emergency telephone number such as "911" or another number specifically set up for monitoring vehicle thefts. The emergency signal transmitted is generated through a use of an analog tape player 74 in operative association with the cellular phone activation mechanism. Alternatively, in lieu of the tape player the emergency signal can be contained in digital form on integrated circuits.

To provide electrical power for operating the aforementioned mechanisms, a power control mechanism 76 is included. The power control mechanism is coupleable to a battery 75 of a vehicle through the battery solenoid 78. The power control mechanism receives 12 volt electrical energy from the battery. The power control mechanism is also coupled to the amplifier mechanism 64, solenoid control mechanism 66, anti-theft shut-down mechanism 68 a cellular phone activation mechanism 70. The power control mechanism has an enabled mode for allowing electrical energy to be delivered to the amplifier mechanism, the solenoid control mechanism, the anti-theft shut down mechanism, and the cellular phone activation mechanism. Furthermore, the power control mechanism has a disabled mode for preventing such delivery of electrical energy.

Lastly, the control console includes a reset and program mechanism 80. The reset and program mechanism is used for selectively placing the power control mechanism 76 in an enabled mode of operation. The power control mechanism is placed in the enabled mode of operation when the reset and program mechanism receives the valid code control signal and a subsequent anti-theft activation control signal from the amplifier mechanism. The reset and program mechanism can also place the power control mechanism in a disabled mode of operation when the reset and program mechanism receives the valid code control signal and a subsequent anti-theft deactivation control signal through the amplifier control mechanism. Additionally, the reset and program mechanism is used for allowing the valid code control signal to be changed. Upon receipt of the valid code control signal and a subsequent program code control signal, another valid code control signal may be sent. Upon receipt of these signals, the latter valid code control signal sent is now designated as the current code control signal. This allows a user to change the valid code control signal when he or she fears that it has been compromised.

A second antenna 82 is also provided. The second antenna is coupled to the cellular phone activation mechanism 90 of the control console 60. The second antenna is used for receiving and transmitting the emergency signal from the tape player 72 or other similar message producing mechanism. This signal may then be received by an external remote monitoring source such as a police department or security service.

To prevent the second solenoid from being tampered with, a rigid cover 90 is included. The cover is formed of aluminum or impact-resistant plastic. The cover is disposed over the second solenoid 50 and is securable to a fire wall 32 within an engine compartment of a vehicle. The cover prevents unauthorized access to the second solenoid. The cover has a hollow box-shaped central portion with a top wall 94 and a periphery extended downwards from the top wall. The periphery is formed of an upper horizontal side wall 96, a lower horizontal side wall 98 and two vertical side walls 100 therebetween. Each side wall has a lip 102 projected outwards therefrom. Each lip has a plurality of holes 104 disposed sequentially thereon.

Also provided are two pairs of elongated rigid metal clamps 106. Each clamp has a first flat end 112 with a hole disposed thereon, a second flat end 114 with a hole disposed thereon, and a u-shaped portion 116 therebetween.

A plurality of tamper-resistant screws 120 are extended through the holes on the lips 102 of the cover 90 for coupling the cover to a fire wall 92 of an engine compartment of a vehicle. Each screw has a screw head 124 with a threaded elongated portion extended therefrom. Each head has a generally octagonal recess 126 formed thereon. The recess defines a bottom surface with eight upstanding interconnected side edges 126 therearound. One of the side edges is further projected inwardly toward the center of the recess to define a triangular protrusion 128. With this structure of screw head, no conventional screwdriver can be used for removing the cover for gaining access to the second solenoid. Furthermore, the fuel lines are maintained by the screws in a rigid stationary configuration against the firewall.

To allow the screws to be tightened or loosened, a special screwdriver 130 is provided. The screwdriver has a rigid shaft 132. The shaft has a base end 134 and a tip end 136. The tip end has a shape conforming to the modified recess on the screw head for allowing it to be fictionally and removably coupled thereto. The base end of the screwdriver will fit a ¼ inch drive wrench or handle.

To operate the present invention, a user points the remote control unit at a target vehicle and enters a valid program code. If a valid program code is entered using keys 18, a valid code control signal is sent, and the control console is operatively engaged. A user may now depress key 22 for engaging the solenoids to prevent operation of the vehicle. To disable the present invention, a user reenters a valid program code using keys 18 and then depresses key 24. To change the program code of the present invention, the user depresses keys 18 to enter the current valid program code, and then depresses blue key 20, and then enters a valid program code using keys 18. To place the present invention in a mode for generating an emergency signal upon command, a valid program code is entered through keys 18, and then key 26 is depressed.

A second embodiment of the present invention is shown in FIG. 12. This embodiment is somewhat similar to the first embodiment as described above, with several notable differences. In this embodiment, an infrared type signaling method is utilized as opposed to the radio wave type embodiment previously described. In this embodiment, the remote control unit 12 is a cellular telephone 140. The cellular telephone contains an infrared transmitter than generates control signals in the form of infrared beams. Furthermore, an infrared sensor 142 is included and is operable in conjunction with the infrared transmitter for detecting the presence of control signals. The functionality of the control console 60 of the previously described embodiment is now realized with a configurable control console consisting of a motherboard 144 in operable association with the sensor 142, a removable V-40 computer card 146, a voice modem stick 148, and a transceiver 150. The computer card is in electronic communication with the modem stick 148 through a serial port hook-up 152. The modem stick is in electronic communication with the transceiver through two-wire hook-up 154. Furthermore, electronic relays 156 are coupled to the 12 volt first solenoid 40 and the 12 volt second solenoid 50 and electronically controlled through a 50 ohm feed 158. The infrared beams generated by the cellular telephone 140 can actuate the sensor 142 at distances up to 40 feet away from the target vehicle. Once the infrared sensor activates the motherboard, the V-40 computer card will emit a 5 ohm pulse through the feed to the two 12 volt relays 156. The two relays will then operably engage the two solenoids 40, 60. This engagement shuts off the fuel to the engine and also locks the hood 44 on a vehicle. If a thief was to break into the vehicle and rewire the ignition in order to start the vehicle, the vehicle would only run for a short time—just long enough to burn the remaining fuel present in the fuel line between the solenoid 60 and the engine.

When a user returns to the vehicle, he presses the "Reset" button and the "Program" button on telephone 140, which then allows him to enter a predetermined telephone number. This action then sends an infrared beam to the infrared sensor and thereby activates the motherboard. The V-40 computer will then emit a 50 ohm pulse to the two 12 volt relays 156. The two relays then disengage solenoids 40, 60, thereby opening the fuel line and unlocking the hood.

In case of a carjacking, the user will allow a car thief to take the vehicle without protest or struggle. When the thief is driving away in the vehicle, the user will press the "Anti-Theft Mode" button on the telephone 140. This action will send an infrared beam to the sensor 142, thereby engaging solenoids 40, 60 through the use of relays 156 to block fuel flow and lock the hood. Eventually, the engine will stall, and the thief will have no choice but to abandon the vehicle.

In a case where the user of the vehicle was unable to activate the system within the prescribed sensing distance of 40 feet, the user can still activate the system for use. The user simply presses the "Cellular Mode" button and then enters the predetermined telephone number. The remote monitoring source then relays the signal to the antenna 30. The transceiver 150 is then activated. The V-40 computer is then programmed to dial "911" or another emergency number. When the "911" operator or other designated individual responds to the call, the voice modem stick 148 transmits a prerecorded message such as "A carjacking is in progress, 1993 Ford 4-door sedan, light blue, Texas license BR-549." At this time the user can use telephone 140 to talk with the operator to provide further information such as location of the incident and description of the thief.

If at the time of the carjacking the user discovers that he does not have his telephone 140 on hand, all he needs to do is use a public telephone and dial the predetermined telephone number. This type of call will allow the system to work in the same fashion as just described. Again, the thief has no option but to leave the vehicle. Thus, with this embodiment, the user has at his option a combination vehicle anti-theft device for protecting his vehicle and a cellular telephone for making conventional-type telephone calls.

The present invention is a device which will disable fuel from flowing to an engine of a vehicle as well as lock the hood latch of a vehicle upon command by a user operating a remote control unit. The present invention comprises a computerized control console and a small remote control unit, which is carried on a user at all times. The control console is permanently mounted within the vehicle either on or under the dashboard and is activated by a special code number known only by the user of the remote control unit.

When leaving a vehicle in a parking area the user need only push the red "Anti-Theft Mode" button on the remote control unit to simultaneously prevent fuel flow to the engine while also locking the hood latch. Upon return, it is then a simple matter to push the appropriate code keys and then reset button to restore fuel flow to the pump while releasing the latch lock. With the present invention in the anti-theft mode, the engine of the vehicle may be started briefly but will only run for a few seconds, and no one will be able to elevate the hood to check the fuel pump.

The present invention provides positive protection against theft anytime a vehicle must be left unattended. It is also extremely valuable when used in an attempted car-jacking. A user may wait until the car jacker is a safe distance away after taking the vehicle and then activate the anti-theft mode. This will quickly stall the engine of the vehicle and the attempt to take the vehicle will be thwarted with no risk to life and limb of the user.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A vehicle anti-theft device for preventing unauthorized operation of a vehicle comprising, in combination:

a hand-held portable remote control unit including a rigid hollow plastic container, a transmitter disposed within the container and operatively extended therefrom, a battery operatively coupled to the transmitter for supplying electrical energy thereto, and control circuitry coupled to the transmitter for controlling its operation, the control circuitry including a plurality of numeric keys extended through the housing with the keys bearing integers from 0 to 9, respectively, and with the numeric keys depressible in a predetermined sequence for causing the transmitter to emit a valid code control signal, the control circuitry further including a first control key, a second control key, a third control key, and a fourth control key with the first control key depressible for causing the transmitter to emit a program code control signal, a second control key depressible for causing the transmitter to emit an anti-theft activation control signal, a third control key depressible for causing the transmitter to emit an anti-theft deactivation control signal, and a fourth control key depressible for causing the transmitter to emit a panic cellular phone call activation control signal;

a first antenna coupleable to a vehicle and tuned for receiving the control signals from the remote control unit;

a plunger-type first solenoid coupleable to a hood latch of a hood on a vehicle, the first solenoid having an engaged orientation for preventing the latch from being opened, thereby preventing access within an engine compartment of a vehicle, and a disengaged orientation for allowing the latch to be opened, thereby allowing access within an engine compartment of a vehicle;

a valve-type second solenoid having an inlet coupleable to a fuel supply line from a gas tank of a vehicle and an outlet coupleable to a fuel delivery line to an engine of a vehicle, the second solenoid having an engaged orientation for preventing flow of fuel from a gas tank to an engine of a vehicle and a disengaged orientation for allowing such flow;

a computerized control console encased in a rigid container and positionable within and coupleable to an engine compartment of a vehicle, the control console further comprising:

amplifier means coupled to the first antenna for receiving the control signals therefrom and transmitting amplified control signals;

solenoid control means for placing the first and second solenoids in the engaged orientation upon receiving the anti-theft activation control signal from the amplifier means;

anti-theft shut down means for placing the first and second solenoids in the disengaged orientation upon receiving the anti-theft deactivation control signal from the amplifier means;

cellular phone activation means for dialing a designated telephone number and transmitting an emergency signal upon receiving a panic cellular phone call activation control signal from the amplifier means;

power control means coupleable to a battery of a vehicle for receiving electrical energy therefrom and coupled to the amplifier means, solenoid control means, anti-theft shut down means, and cellular phone activation means, the power control means having an enabled mode for allowing electrical energy to be delivered to the amplifier means, solenoid control means, anti-theft shut down means, and cellular phone activation means and a disabled mode for preventing such delivery; and reset and program means for selectively placing the power control means in an enabled mode of operation upon receiving the valid code control signal and the anti-theft activation control signal from the amplifier means and for placing the power control means in a disabled mode of operation upon receiving the valid code control signal and the anti-theft deactivation control signal, the reset and program means further used for allowing the valid code control signal to be changed upon receipt of the valid code control signal, the program code control signal, and another valid code control signal, respectively, and with this latter valid code control signal being designated as the current valid code control signal;

a second antenna coupled to the cellular phone activation means of the control console for receiving and transmitting the emergency signal for subsequent receipt by an external remote monitoring source;

a rigid cover disposed over the second solenoid and securable to a firewall within an engine compartment of a vehicle to prevent unauthorized access thereto, the cover having a hollow box-shaped central portion with a top wall, a periphery extended downwards from the top wall formed of an upper horizontal side wall, a lower horizontal side wall, and two vertical side walls therebetween, each side wall having a lip projected outwards therefrom and with each lip having a plurality of holes disposed thereon;

two pairs of elongated rigid clamps each having a first flat end with a hole disposed thereon, a second flat end with a hole disposed thereon, and a U-shaped portion therebetween;

a plurality of screws extended through the holes on the lips of the cover for coupling the cover to a firewall within an engine compartment of a vehicle, one pair of clamps to a firewall within an engine compartment of a vehicle and securing a fuel supply line from a gas tank of a vehicle therebetween, and the other pair of clamps to a firewall within an engine compartment of a vehicle and securing a fuel delivery line to an engine of a vehicle therebetween, each screw having a screw head with a generally octagonal recess formed thereon to define a bottom surface with eight upstanding side edges extended therearound and with one of the side edges further projected inwardly toward the center of the recess to create a triangular protrusion; and a screwdriver having a rigid shaft with a base end and a tip end, and with the tip end having a shape conforming for removable securement to each of said screw heads for tightening and loosening said screws.

2. A vehicle anti-theft device comprising:

hand-held portable remote control transmitter means for selectively emitting a valid code control signal, the control transmitter means including an anti-theft activation control signal, and an anti-theft deactivation control signal;

receiver means coupleable to a vehicle and tuned for receiving the control signals;

first switch means having an engaged orientation for preventing a hood of a vehicle from being opened and a disengaged orientation for allowing the hood to be opened;

second switch means having an engaged orientation for preventing flow of fuel from a gas tank to an engine of a vehicle and a disengaged orientation for allowing such flow;

switch control means coupled to the receiver means for placing the first and second switch means in the engaged orientation upon receiving the anti-theft activation control signal;

anti-theft shut down means coupled to the receiver means for placing the first and second switch means in the disengaged orientation upon receiving the anti-theft deactivation control signal;

power control means coupleable to a battery of a vehicle for receiving electrical energy therefrom and coupled to the switch control means and anti-theft shut down means for supplying electrical energy for operation, the power control means having an enabled mode for allowing electrical energy to be supplied to the switch control means and anti-theft shut down means and a disabled mode for preventing such supply; and reset and program means coupled to the receiver means for selectively placing the power control means in an enabled mode of operation upon receiving the valid code control signal and the anti-theft activation control signal and for placing the power control means in a disabled mode of operation upon receiving the valid code control signal and the anti-theft deactivation control signal.

3. The vehicle anti-theft device as set forth in claim 2 wherein the hand-held portable remote control transmitter means further selectively emits a panic cellular phone call control signal to a remote monitoring source for subsequent relay to the receiver means to act as an anti-theft activation control signal.

4. The vehicle anti-theft device as set forth in claim 2 wherein the first switch means is an electrically energizeable plunger-type solenoid.

5. The vehicle anti-theft device as set forth in claim 2 wherein the second switch means is an electrically energizeable valve-type solenoid.

6. The vehicle anti-theft device as set forth in claim 2 further including:

a rigid cover disposed over the second switch means and with the cover securable to a firewall within an engine compartment of a vehicle to prevent unauthorized access thereto;

a plurality of screws extended through and securing the cover to a firewall within an engine compartment of a vehicle, each screw having a screw head with a generally octagonal recess formed thereon to define a bottom surface and eight upstanding side edges and with one of the side edges projected inwardly to create a triangular protrusion; and a screwdriver having a rigid shaft with a base end and a tip end, and with the tip end having a shape conforming for removable securement to each of said screw heads for tightening and loosening said screws.

7. The vehicle anti-theft device as set forth in claim 2 wherein:

the hand-held portable remote control transmitter means transmits control signals in the form of radio waves; and the receiver means is an antenna for receiving the radio waves.

* * * * *